Patented Apr. 10, 1923.

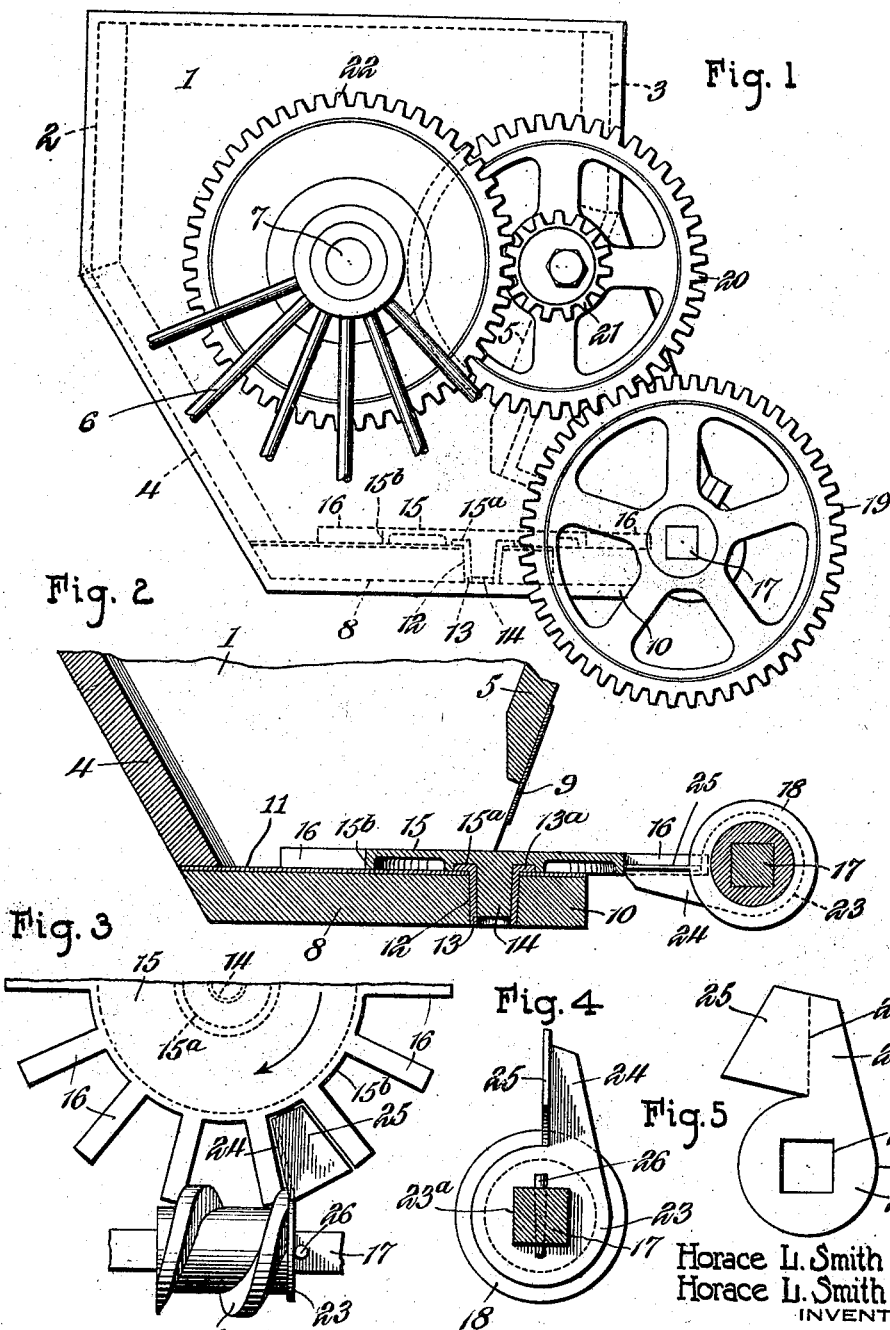

1,451,312

UNITED STATES PATENT OFFICE.

HORACE L. SMITH AND HORACE L. SMITH, JR., OF PETERSBURG, VIRGINIA.

FERTILIZER AND LIME DISTRIBUTOR.

Application filed April 11, 1922. Serial No. 551,691.

*To all whom it may concern:*

Be it known that we, HORACE L. SMITH and HORACE L. SMITH, Jr., citizens of the United States, residing at Petersburg, in the county of Dinwiddie and State of Virginia, have invented a new and useful Fertilizer and Lime Distributor, of which the following is a specification.

This invention relates to fertilizer and lime distributors.

The object is to improve the construction of machines for distributing lime, fertilizer or other material, which employ discs or plates with feeding fingers by providing means for constantly cleaning out the spaces between the feeding fingers and to insure a continuous feed of the same amount of material at all times whether the material be in a dry or moist condition.

A full and complete understanding of the invention may be obtained from a consideration of the following detailed description, taken in connection with the accompanying drawing forming a part of the specification; it being understood that while the drawing shows a practical form of the invention, the latter is not confined to strict conformity therewith, but may be changed or modified, so long as such changes or modifications mark no material departure from the salient features of the invention, as specifically pointed out in the appended claims.

In the drawing, in which similar reference characters designate corresponding parts throughout the several figures—

Figure 1 is a side elevation of a portion of a lime or fertilizer distributor having the improvements incorporated therein;

Figure 2 is a detail transverse sectional view through the bottom of the hopper and showing the feeding and cleaning means;

Figure 3 is a detail plan view of a portion of a feed disc together with the drive worm therefor and the cleaning device attached to the drive shaft and in active position between the fingers of the feed disc;

Figure 4 is a detail section through the drive shaft, showing the worm and the cleaning device thereon;

Figure 5 is a detail plan view of the blank from which the cleaning device is formed.

While the machine of the present application is useful for distributing the various kinds of material usually handled by this class of machines, the improvements are particularly adapted for the handling of lime. It has been found that there is a great demand at this time for a machine that will properly take care of and handle the latter material during the process of distribution, the farmers fast becoming educated to the necessity for the use of lime upon the soil to increase production. Lime is very difficult material to distribute with the proper and desired uniformity, especially if the same has become damp or moist and, as it is almost impossible for the average farmer to maintain the supply of lime in a perfectly dry condition, especially if the supply is a large one, great difficulty has been encountered when it has been attempted to handle the same with an ordinary machine having the usual feeding means, agitators, etc., as the latter only tend to work the material up into a plastic state, and in a short time the machine ceases to function, due to the fact that the feed openings in the bottom become stopped up.

To overcome these difficulties, the present improvements have been provided and incorporated in a distributing machine having the usual hopper mounted upon wheels, and adapted to be drawn over the ground in the usual manner.

In the drawing only such adjacent portions of the machine are illustrated as will serve to fully explain the nature, location and functions of the various essential parts of the invention, it being understood that the same may be employed in machines of various kinds.

The hopper 1 having a front and rear wall 2 and 3 respectively, terminating at their lower portions in inclined, deflecting walls 4 and 5, is made of any desired dimensions depending on the capacity desired, and is mounted on wheels in the usual manner. A portion of the rear wheel 6 is indicated in Fig. 1 of the drawing, and the wheels are suitably mounted on the machine axle 7, which extends through the hopper for bearing in the opposite wheel (not shown). The hopper is further provided with end walls and a bottom 8, while the top is open to facilitate filling the same.

The rear wall 5 is terminated short of the bottom 8, and is provided with an adjustable gate 9, which is adapted to regulate the size of the opening between the bottom and the lower edge of said rear wall, the said bottom extending somewhat to the rear of the adjustable gate, as at 10, and having, on its upper surface, a sheet of metal 11 to take up wear. The extended portion 10 is provided with an opening 12, located substantially beneath the gate 9, and said opening is adapted to receive a wear sleeve 13, into which is placed the centrally located stud 14, formed integrally with the metallic feeding plate or disc 15 and to permit the same to rotate freely therein. The upper end of the sleeve is provided with an outstanding flange 13ª resting upon the upper face of the wear plate 11 and supporting the said sleeve within the opening 12. The plate or disc 15 is of a diameter to extend inwardly beyond the center of the bottom 8, and is cored out to reduce the weight of the same, the central portion being provided with an annular socket 15ª, for the reception of the outstanding flange 13ª of the sleeve, which prevents any lateral movement of the disc about the axis of rotation, the outer periphery of the disc being provided with a depending flange 15ᵇ extending entirely around the same and adapted to bear upon the wear plate 11 of the bottom 8. This construction provides for the ready removal of the disc and the sleeve when desired.

The disc 15 is provided with integrally formed outstanding fingers 16 arranged radially thereto and of a length to extend toward but not to reach the bottom edge of the inwardly directed lower portion of the front wall 2, as clearly shown in Figure 2 of the drawing, and said fingers are preferably fourteen in number, though any other desired number may be employed. They project beyond the rear edge of the extended portion 10 of the bottom 8.

Suitably mounted in bearings carried by rearwardly extending lower portions of the sides or end walls of the hopper, is a shaft 17, extending entirely across the machine, and having its longitudinal axis in horizontal alinement with the periphery of the disc 15. This shaft, which is preferably square in cross section, carries a worm 18 for each feed disc (eight discs being usually employed) the diameter of the said worm being such as to engage with the outer extremities of the fingers 16, as clearly shown in Figure 3 of the drawing, so that, upon revolution of the shaft 17, the feed disc 15 is caused to rotate about its vertical axis a slight distance, the spacing and proportions being such as to require fourteen revolutions of the shaft 17 to actuate the feed disc one complete revolution, a single revolution of said shaft causing the disc to travel only the distance between two adjacent fingers 16, as will be readily understood. In a machine of the size and proportion stated, it is advisable that the direction of the worms 18 be reversed so as to prevent any end thrust. In other words, four of the worms at one half of the machine may be righthand worms, while the remaining four at the opposite end of the machine may be lefthand worms, and the said worms are adjustably secured to the shaft 17 by breakable pins, set screws or in any other manner.

The shaft 17 is adapted to be rotated by means of a gear 19, suitably secured to the projecting end thereof at one side of the machine, said gear meshing with another gear 20, arranged above the same and carried by any suitable adjustable bearing, which will permit of horizontal movement of the mounting for the gear 20. The shaft or spindle carrying the wheel 20 is also provided with a pinion 21, which meshes with a relatively large gear 22, suitably mounted on the axle 7, adjacent to the carrying wheel indicated at 6, so that when the machine is drawn forward by draft animals or otherwise, the train of gears will cause the shaft 17 to rotate at a reduced rate of speed which, in turn, will result in the rotation of the feed discs or plates 15 in a slow regular movement to bring the pockets formed between two adjacent fingers 16 to the rear and beyond the edge of the bottom extension 10, and to drop the contents of the pockets onto the ground.

Any suitable agitating means, directing flanges or other devices generally used within the hopper to facilitate the feeding of the contents thereof, may be employed, none of which, however, have been illustrated in the drawing.

In order to prevent the accumulation of the material being distributed between the adjacent fingers 16 of the feed discs, a cleaning device has been provided, which is in the form of a sheet metal disc 23, having an integral, outstanding arm 24 provided with a wing 25, frusto-conical in shape, and integrally formed therewith and adapted to be bent along the line 25ª (see Figure 5) to stand at right angles to the arm 24, and adapted to fit and to freely slide between two adjacent fingers of the feed disc. The cleaning device is mounted on the shaft with the latter extending through the square opening 23ª, and the disc 23 is abutted against the adjacent end of the worm 18, as indicated in Figure 5 of the drawing, a tapered pin 26, or similar retaining device being employed to prevent the cleaner from sliding along the shaft, as will be readily understood. Any clogging of the material between the fingers is thus effectually dislodged at each revolution of the worm, the cleaning wing 25 being caused to traverse each succeeding pocket. The space between the fingers 16 increases in diameter outwardly, and the cleaning device corresponds in shape with said space, being only a trifle narrower than the space between the fingers.

The cleaning device or plate may be constructed of cast metal, or otherwise formed. The essential feature is the provision of a cleaner for this purpose, and not its detailed construction. We do not wish to be limited to the use of worms as a driving element for the discs.

From the foregoing it will be seen that a simple, cheaply manufactured cleaning attachment has been provided, which may be formed by a single stamping operation to form the disc, extending arm and the bendable wing, and that when the cleaner is properly mounted on the actuating shaft in abutting relation to the worm, the same is in correct position to act between the projecting fingers of the feed wheel which are actuated by said worm, and the said cleaner may be reversed and used at the opposite end of the worm, thus being applicable at either end of the machine to coact with the right or the lefthand turning feed discs. While we have shown but one disc, one worm and one cleaning device, this is done for simplicity of illustration, and, in practice, a plurality are employed (usually eight) with a corresponding lengthening of the hopper.

What is claimed is—

1. In a device of the character described, a hopper having its bottom provided with a socket, a sleeve fitted in the socket and having a flanged head overhanging the top of the socket, and a disk having a depending stud fitted in the sleeve and provided with an annular socket surrounding the stud and spaced from the same, said annular socket providing for the reception of the flanged head of the sleeve, and means for rotating said disk.

2. In a device of the character described, the combination with a disc having a plurality of radially extending fingers at its periphery, of a shaft for driving the disc provided with a wing to engage between any two of the fingers to clear the space between the same.

3. In a device of the character described, the combination with a disc having a plurality of radially extending fingers at its periphery, said fingers being spaced apart and the spaces between the fingers being open at the periphery of the disc, of a shaft, means mounted on the shaft for driving the disc, and means also mounted on the shaft for engaging in the space between the fingers for cleaning the same.

4. In a device of the character described, the combination with a disc having a plurality of radially extending fingers at its periphery, of a shaft, means for rotating the same, a worm carried by the shaft to engage with the fingers for driving the same, and a cleaning device also mounted on the shaft and engaged between the fingers for keeping clean the spaces therebetween.

5. In a device of the character described, the combination with a disc having a plurality of radially extending fingers at its periphery, of a shaft for driving the disc, and a cleaning plate carried by the shaft and adapted to engage the spaces between the fingers for cleaning the same.

6. In a device of the character described, the combination with a disc having a plurality of radially extending fingers at its periphery, of a shaft for driving the disc, and a rotatable cleaning device carried by the shaft and adapted to substantially fill the spaces between the fingers to keep the fingers clean.

7. In a device of the character described, the combination with a disc having spaced radial fingers extending from its periphery, the spaces between the fingers being open, of a rotatable shaft, a worm mounted on the shaft to engage with the fingers to drive the disc, and a cleaning device mounted on the shaft adjacent the worm and having a plate or wing which substantially fits the spaces between the fingers, said plate or wing extending beyond and at one side of the worm.

8. A fertilizer or lime distributor comprising a hopper, a driving axle, said hopper having a discharge opening at its rear wall, a socket in the bottom of the hopper, a sleeve in said socket, a longitudinal shaft in rear of said bottom, means for rotating the shaft from the axle of the distributor, a worm mounted on the shaft, a feed disc resting on the bottom of the hopper and having a central stud fitting into the sleeve to permit the disc to rotate, and radial fingers carried by the disc and extending beyond the rear edge of the hopper bottom and being engaged by the worm to be actuated by the latter for feeding the contents of the hopper over the rear edge of the bottom.

9. A fertilizer or lime distributor comprising a hopper, a driving axle, said hopper having a discharge opening at its rear wall, a socket in the bottom of the hopper, a sleeve in said socket, a longitudinal shaft in rear of said bottom, means for rotating the shaft from the axle of the distributor, a worm mounted on the shaft, a feed disc resting on the bottom of the hopper and having a central stud fitted into the sleeve to permit the disc to rotate, and radial fingers carried by the disc and extending beyond the rear edge of the hopper bottom and being engaged by the worm to be actuated by the latter for feeding the contents of the hopper over the rear edge of the bottom, and a cleaner carried by the worm shaft adjacent to the worm, said cleaner comprising a hub disc having an opening fitting the shaft, and a frusto-conical shaped wing or extension fitting and adapted to pass between two adjacent fingers of the feed disc to remove accumulations therein.

In testimony, that we claim the foregoing as our own we have hereto affixed our signatures.

HORACE L. SMITH.
HORACE L. SMITH, Jr.